US008103657B2

(12) United States Patent
Ban et al.

(10) Patent No.: US 8,103,657 B2
(45) Date of Patent: *Jan. 24, 2012

(54) LOCATING AND RETRIEVING DATA CONTENT STORED IN A COMPRESSED DIGITAL FORMAT

(75) Inventors: Oliver K. Ban, Austin, TX (US); Timothy A. Dietz, Austin, TX (US); Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,549

(22) Filed: Nov. 12, 2010

(65) Prior Publication Data

US 2011/0060743 A1  Mar. 10, 2011

Related U.S. Application Data

(63) Continuation of application No. 11/274,861, filed on Nov. 15, 2005, now Pat. No. 7,865,501.

(51) Int. Cl.
*G06F 7/00* (2006.01)
(52) U.S. Cl. ......... 707/713; 707/711; 709/216; 709/217
(58) Field of Classification Search .................. 707/713
See application file for complete search history.

(56) References Cited

U.S. PATENT DOCUMENTS

| 6,098,082 | A | 8/2000 | Gibbon et al. |
| 6,289,165 | B1* | 9/2001 | Abecassis ............... 386/224 |
| 6,801,576 | B1 | 10/2004 | Haldeman et al. |
| 6,879,835 | B2 | 4/2005 | Greene et al. |
| 7,035,804 | B2 | 4/2006 | Saindon et al. |
| 2002/0161579 | A1* | 10/2002 | Saindon et al. ............ 704/235 |
| 2003/0040962 | A1 | 2/2003 | Lewis |
| 2003/0093790 | A1* | 5/2003 | Logan et al. ............... 725/38 |
| 2003/0104820 | A1* | 6/2003 | Greene et al. ............ 455/456 |

* cited by examiner

*Primary Examiner* — Fazlul Quader
(74) *Attorney, Agent, or Firm* — Yee & Associates, P.C.; Steven L. Bennett

(57) ABSTRACT

A method and apparatus is provided for locating and retrieving specified data content in a database. The data comprises compressed digital audio or video data files associated with the recorded speech. Retrieval of the specified content requires decompression of only a portion of the compressed data. A method for locating specified content of the above type is provided. A compressed audio file comprising recorded speech is converted into a corresponding text file. A searchable index is constructed from the text file. One or more specified search arguments are used to search respective elements of the searchable index in order to detect one or more text segments. The identifiers of respective detected segments are then used to locate the specified content in the audio file. Only portions of the audio file that contain specified content require decompression, in order to retrieve the content.

20 Claims, 3 Drawing Sheets

| TEXTUAL DATA FILE - PARTICIPANT B | | | |
|---|---|---|---|
| 304a | 304b | 304c | 304d |
| 08-25-05 10:25:00 | 08-25-05 10:25:30 | 08-25-05 10:26:00 | 08-25-05 10:26:30 |
| 306a | 306b | 306c | 306d |

302

| AUDIO DATA FILE - PARTICIPANT B | | | |
|---|---|---|---|
| 310a | 310b | 310c | 310d |
| 08-25-05 10:25:00 | 08-25-05 10:25:30 | 08-25-05 10:26:00 | 08-25-05 10:26:30 |
| 306a | 306b | 306c | 306d |

308

LOCATING AND RETRIEVING DATA CONTENT STORED IN A COMPRESSED DIGITAL FORMAT

CROSS-REFERENCE TO RELATED APPLICATION

This application is a continuation of application Ser. No. 11/274,861, filed Nov. 15, 2005, status pending.

BACKGROUND OF THE INVENTION

1. Field of the Invention

The invention disclosed and claimed herein generally pertains to a method and apparatus for locating and retrieving specified content, wherein the content is in a database containing digitized data that has been compressed. More particularly, the invention pertains to a method of the above type wherein the digital data includes compressed audio or video data derived from the speech of one or more speakers. Even more particularly, the invention pertains to a method of the above type wherein the specified content may be located and retrieved from the database without first decompressing other portions of the compressed data that are unrelated to the specified content.

2. Description of the Related Art

At present, a great deal of important business information is exchanged during discussions involving two or more persons. The discussions can include face-to-face meetings, and can also include conference calls using devices such as telephones or video conferencing equipment. The material discussed can include substantial amounts of detailed technical or financial information. Accordingly, it is often necessary to make a record of the discussions, and to retain the record for future reference or other use.

For conferences of the above type, the task of recording associated audio and video data continues to become progressively easier and less expensive. The recorded audio data can include every word of each conference participant, and video data can include viewable images of respective participants as they speak. Recordings can be made of the same participants for successive discussions that take place over a period of time and cover a number of different topics. However, all such data, both audio and video, is inherently analog in nature. On the other hand, to most effectively process, transmit and store such data, the recorded analog audio and video data should be converted into digital form. The digitized data can also be compressed, for more compact and efficient storage.

Notwithstanding the benefits of storing and compressing data as described above, there can also be significant disadvantages, if it becomes necessary to locate and retrieve a particular portion of such data. For example, it may be desired to access all statements in a compressed audio data file that were made by a particular participant in regard to a particular topic. In one obvious prior art approach, the entire audio data file would first be decompressed and converted to analog form. The audio data would then be manually checked, by listening for the desired statements. If the analog data comprised eight hours of audio recording, for example, eight hours of listening would be required.

In another prior art approach for searching compressed audio and video data, different segments or portions of the data files are labeled with brief text. These text labels are then available, at some time in the future, for searching and matching by means of a text search engine. However, since this prior art approach is entirely text based, text labels must be applied extensively to the audio and video data files. Otherwise, the text search engine could miss important elements contained in such files. At present, the text labels must be manually created and applied, and this can require a substantial amount of effort.

Clearly, it would be beneficial to provide a more efficient and completely automated procedure for searching for specified content included in compressed audio and video data files, and for retrieving such content after it was located.

SUMMARY OF THE INVENTION

The invention generally provides a method for locating and retrieving specified data content in a database, wherein data in the database is derived from recorded speech. While the data may comprise compressed digital audio or video files associated with the recorded speech, retrieval of the specified content requires decompression of only a portion of the compressed data. The recorded speech may result from discussions involving two or more people over a period of time, or may be the speech of a single person, such as a series of lectures. In one useful embodiment of the invention, a method is provided for locating specified content of the above type. The method includes the step of converting an audio file comprising the recorded speech into a corresponding text file, wherein the text file is divided into multiple text file segments, each having a unique identifier. The method further includes selectively processing the text file to construct a searchable index. The index comprises a number of index elements, each of the index elements being associated with particular information located in one or more of the text file segments. One or more specified search arguments are used to search respective elements of the searchable index, in order to detect one or more text segments that each contains at least some of the specified content. The identifiers of respective detected text segments are then used to locate the specified content in the audio file.

BRIEF DESCRIPTION OF THE DRAWINGS

The novel features believed characteristic of the invention are set forth in the appended claims. The invention itself, however, as well as a preferred mode of use and further objectives and advantages thereof, will best be understood by reference to the following detailed description of an illustrative embodiment when read in conjunction with the accompanying drawings, wherein:

DETAILED DESCRIPTION

Figure 1:
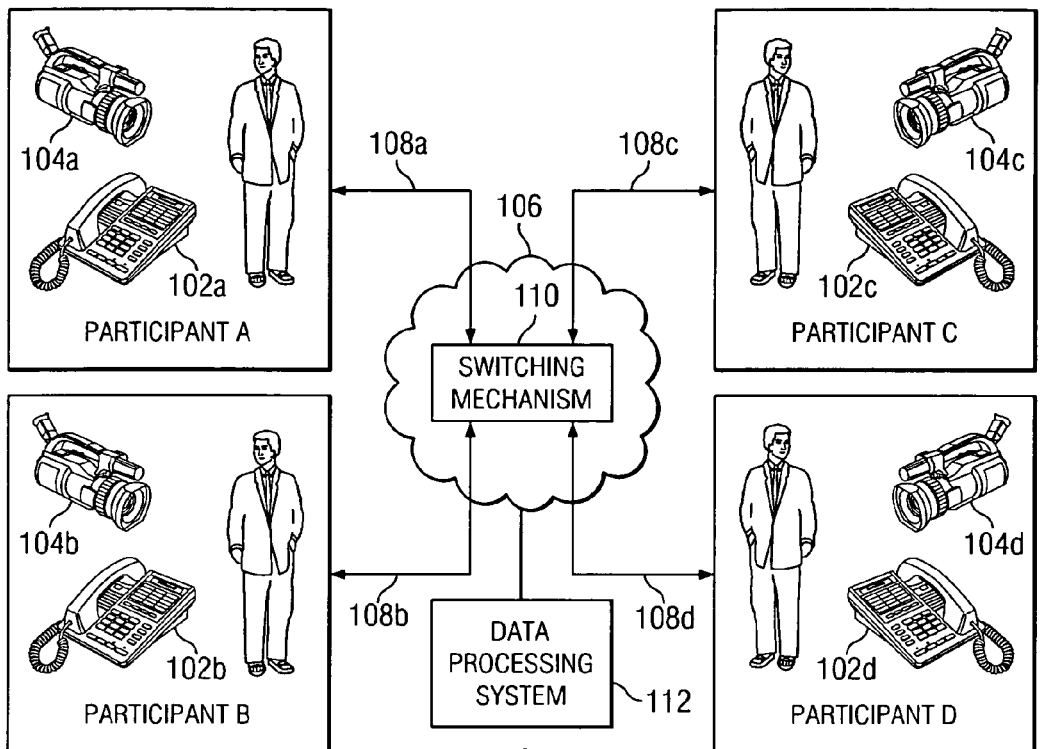
FIG. 1 is a schematic diagram showing a conferencing arrangement for acquiring data to be used in connection with an embodiment of the invention.

Referring to FIG. 1, there are shown representative conference participants A-D. Participants A-D are at different locations, but are each provided with electronic communication devices for engaging in a succession of conferences or discussions with one another. More particularly, participants A-D are respectively provided with telephones 102a-d, or with other audio responsive devices for transmitting human speech. Participants are further provided with video cameras 104a-d or the like, for generating image signals of respective participants as they engage in discussions with one another.

Referring further to FIG. 1, there is shown the communication devices of participants A-D connected to a generalized communication network 106, by respective links or transmission paths 108a-d. Network 106 could, for example, be the Internet or a local area network (LAN). In addition, FIG. 1 shows each of the paths directed to a common switching mechanism 110. Thus, switching mechanism 110 receives all the audio signals provided by respective devices 102a-d, as well as the video signals generated by devices 104a-d. Switching mechanism 110 is further operable to route all the audio and video transmissions received from one participant to other participants, during successive conferences.

FIG. 1 further shows a data processing system 112 connected to receive an input from switching mechanism 110. More particularly, the data processing system receives all the audio and video information produced by respective participants A-D, and stores this information in audio and video data files. This data is derived from one or more conferences among the participants, over a selected period of time. Usefully, the data for each participant is stored in files separate from those of other participants. This may be accomplished, for example, by means of software that enables system 112 to readily distinguish between audio signals representing the voices of different participants.

After the audio and video data files have been stored, system 112 is operated to process the stored data files in accordance with an embodiment of the invention. This embodiment is described hereinafter, in further detail.

Figure 2:
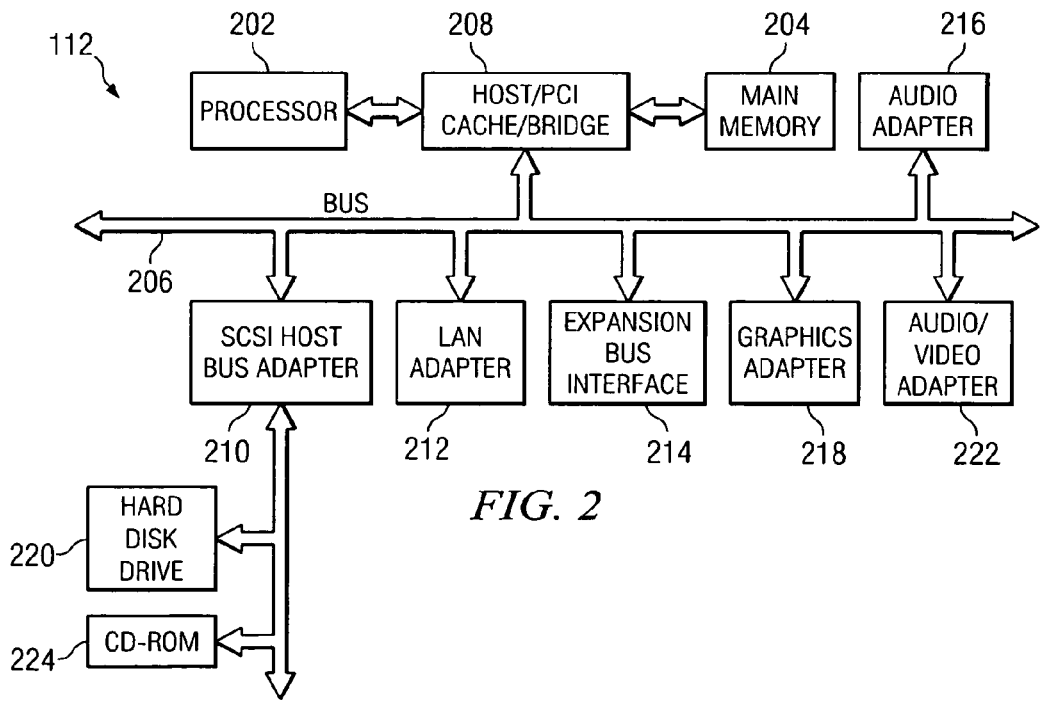
FIG. 2 is a block diagram showing a data processing system for use in the arrangement of FIG. 1 to implement an embodiment of the invention.

Referring to FIG. 2, there is shown a block diagram of a generalized data processing system, which is usefully employed as data system 112 in implementing embodiments of the present invention. Data processing system 112 exemplifies a computer, in which code or instructions for implementing the processes of the present invention may be located. Data processing system 112 usefully employs a peripheral component interconnect (PCI) local bus architecture, although other bus architectures may alternatively be used. FIG. 2 shows a processor 202 and main memory 204 connected to a PCI local bus 206 through a Host/PCI bridge 208. The stored audio and video data files referred to above may be stored in memory 204. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 222 are connected to PCI local bus 206 by means of add-in boards inserted into expansion slots. SCSI host bus adapter 210 provides a connection for hard disk drive 220, and also for CD-ROM drive 224.

An operating system runs on processor 202 and is used to coordinate and provide control of various components within data processing system 112 shown in FIG. 2. The operating system may be a commercially available operating system such as Windows XP, which is available from Microsoft Corporation. Instructions for the operating system and for applications or programs are located on storage devices, such as hard disk drive 220, and may be loaded into main memory 204 for execution by processor 202.

After recorded audio data is received by data processing system 112 as described above, the audio data is converted from analog to digital form. The data processing system is then operated to carry out an initial step in an embodiment of the invention. More particularly, system 112 converts all the digitized speech-related audio information in an audio data file into corresponding text. System 112 may, for example, implement currently available speech to text conversion software, such as products known as IBM ViaVoice or Dragon NaturallySpeaking software, to perform this task. Thus, recorded speech of each of the participants A-D is rendered into readable text, in a textual data file. Usefully, the text representing the contribution of each conference participant, in like manner with the audio files, will be placed in a textual data file that is separate from those of other participants. After textual data files have been prepared from the audio data for all participants, the audio data is compressed for more efficient storage.

Figures 3, 4:
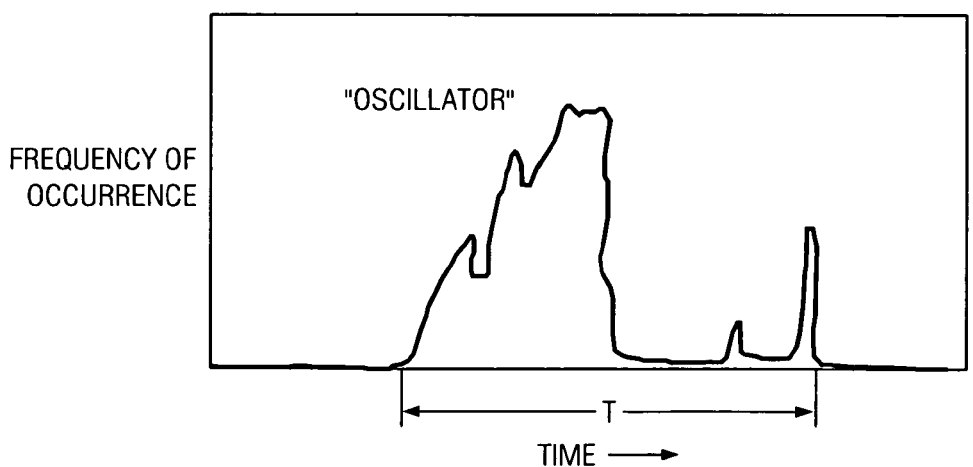
FIG. 3 is a schematic diagram illustrating text and audio file segment identification in an embodiment of the invention.
FIG. 4 is a schematic diagram illustrating the generation of index elements for a searchable index in an embodiment of the invention.

Referring to FIG. 3, there is shown a further task carried out by data processing system 112 as it prepares a textual data file. FIG. 3 shows a portion of a textual data file 302, which provides the text of comments or other contributions of participant B. File 302 is divided into successive 30-second text data segments 304a-d, wherein time stamps 306a-d are applied to respective text segments. Thus, segment 304a contains a textual representation of any audio contribution made by participant B during a 30-second period between 10:25:00 and 10:25:30, on the date indicated. Segment 304b contains the textual representation during the immediately following 30-second period. It will thus be apparent from FIG. 3 that the content at any segment of the textual data file of participant B can be readily located, by providing the corresponding time stamp for such segment.

Referring further to FIG. 3, there is shown a portion of the compressed audio data file 308 that corresponds to textual data file portion 302. That is, file portion 308 comprises audio data segments 310a-d, wherein the data in each segment is the compressed audio data equivalent of the textual data in segments 304a-d, respectively. Moreover, it is seen that each audio data segment 310a-d is provided with the same time stamp 306a-d as its respectively corresponding text segment 304a-d. Accordingly, if the time stamp of a text data segment is known, such time stamp can be used to locate the corresponding audio segment of the compressed audio data file. The data in the audio segment may then be readily accessed.

After data processing system 112 has generated textual data files with time stamps, as described above, each text file is analyzed with data mining software, in order to identify topics of discussion for other key elements. For example, a concordance may be created of all words used in the discussions among the participants, as indicated by the text files. Respective words in the concordance are then processed, to identify words and word combinations, or phrases, that have the greatest frequencies of use. Such words and phrases are likely to be topics of the adjacent blocks of discussion. Each participant may also assign topics to blocks of text manually, based on his or her understanding of the respective discussions.

After various words or phrases are found to be topics, or are otherwise determined to likely be of interest, all such words and phrases are placed into a searchable index as index elements. In the index, a given element is linked to the time stamps of all the text data segments in which it occurs or is found. The index may be stored, for example, in memory 204 of data processing system 112.

As an example of an element of the searchable index, FIG. 4 shows the frequency of the word "oscillator", as used by one or more participants during a time period T in one of the conferences. A word may be selected as an index element if it is found to have a specified minimum frequency of use.

Figure 5:
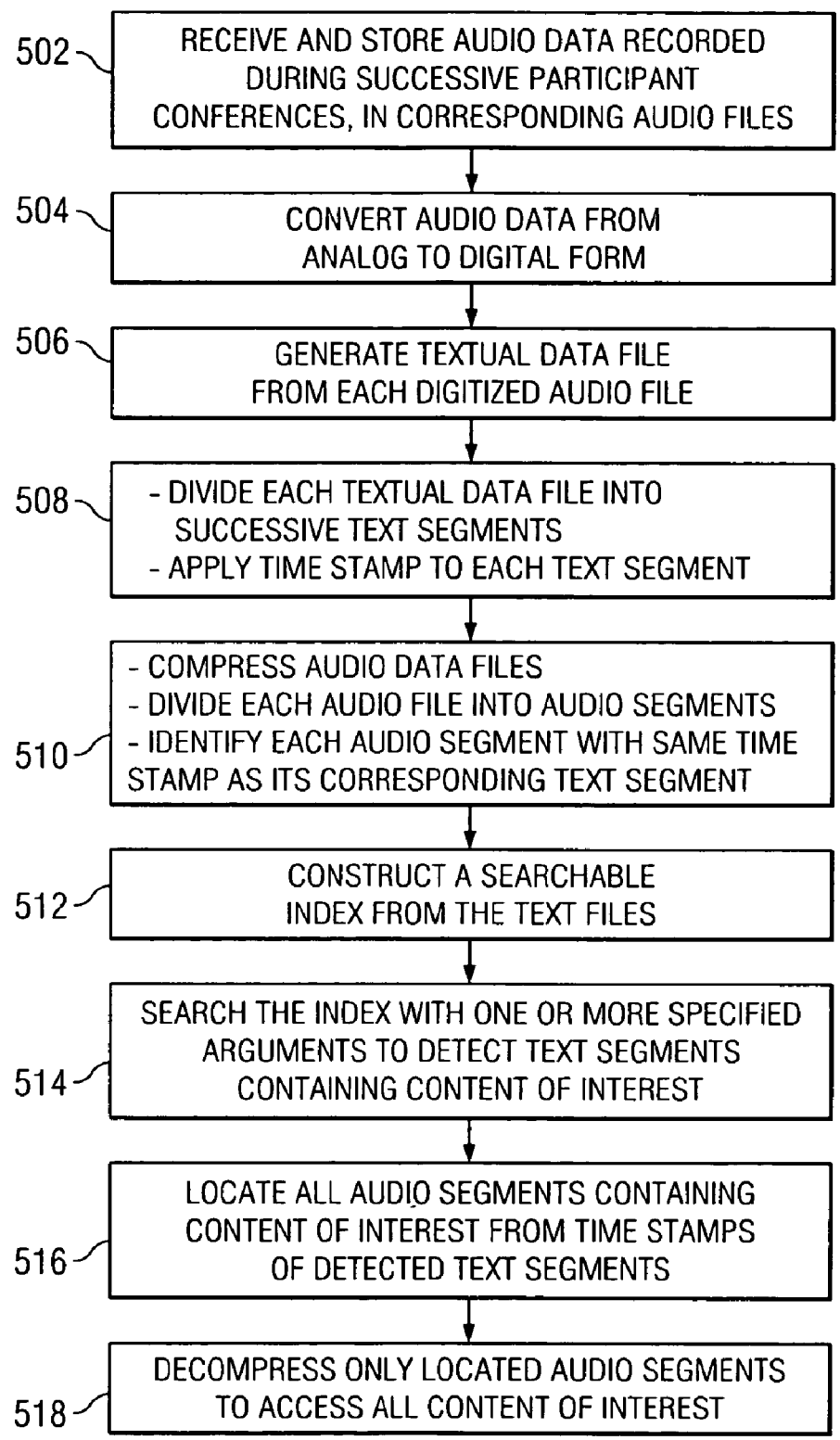
FIG. 5 is a flow chart illustrating respective steps of an embodiment of the invention.

FIG. 5 is a flow chart briefly setting forth successive steps of a procedure in accordance with the invention, for locating and retrieving specified audio file content. Function block 502 of FIG. 5 shows that audio data, recorded during a series of participant conferences, is received and stored in corresponding audio data files. As stated above, the audio data for different participants is stored in separate audio files. Function blocks 504 and 506 respectively show that the audio data is converted from analog to digital form, and corresponding textual data files are generated from the respective digitized audio files.

Function block 508 indicates that each text file is divided into successive text segments, and a time stamp is applied to each text segment. In accordance with function block 510, respective audio files are compressed and then similarly divided into audio segments. As stated above, each audio segment corresponds to a text segment, and contains corresponding data. Each audio segment is identified by the same time stamp as its corresponding text segment.

Referring further to FIG. 5, function block 512 shows construction of a searchable index. In accordance with function block 514, a number of specified arguments are used to search the index. For example, the arguments could be "phased lock loop" combined with "keystone project". Searching the index for these arguments would provide the time stamp identifying each text segment that contained content pertaining to both terms together. As shown by function block 516, the time stamps of text segments detected during the search would then be used to locate the corresponding audio segments, which would collectively contain all the content of interest. In accordance with function block 518, only those audio segments would be decompressed to recover the content of interest. Other segments of the audio file would not be decompressed.

It will be readily apparent that a video file corresponding to audio and text files could be searched for specified content, in like manner with the audio file.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with stored data derived from recorded speech of one or more human speakers, a method for locating specified speech content included in the stored data, wherein said method comprises the steps of:

converting an audio file into a corresponding text file, wherein said audio file comprises particular content of said recorded speech in an audio form, and said text file comprises said particular content of said recorded speech in a textual form, said text file being divided into multiple text segments that are each provided with a unique identifier;

constructing a searchable index comprising a number of index elements from said text file, each of said index elements being associated with particular information located in one or more of said text segments;

searching said index elements of said searchable index with one or more specified search arguments, in order to detect one or more text segments of said text file that each respectively contains at least some of said specified speech content; and using the identifiers of respective detected text segments to locate said specified speech content in said audio file.

2. The method of claim 1, wherein:

said audio file comprises multiple audio segments, each audio segment containing data corresponding to the data of a corresponding text segment, each audio segment being identifiable by the identifier of its corresponding text segment.

3. The method of claim 2, wherein:

said stored data including said audio file is in a digitized and compressed form.

4. The method of claim 3, wherein:

specified content contained in a given one of said audio segments is retrieved by decompressing said given audio segment of said compressed audio file, while other portions of said audio file remain compressed.

5. The method of claim 4, wherein:

each of said segment identifiers comprises a time stamp.

6. The method of claim 1, wherein:
said searchable index is constructed by generating a concordance of words occurring in said text file, and using said concordance to apply weights to selected words and phrases.

7. The method of claim 1, wherein:
elements in said searchable index are selected from a group that includes words and phrases occurring in said text file with a specified minimum level of frequency.

8. The method of claim 1, wherein:
said recorded speech is provided by a plurality of speakers, and the speech of each speaker is recorded in a different audio file.

9. The method of claim 1, wherein:
said audio file is converted into said text file by means of specified speech recognition software.

10. The method of claim 4, wherein:
said stored data includes a digitized and compressed video data file corresponding to said audio file.

11. In association with stored data derived from recorded speech of one or more human speakers, apparatus for locating specified speech content included in the stored data, said apparatus comprising:
a first device for converting an audio file into a corresponding text file, wherein said audio file comprises particular content of said recorded speech in an audio form, and said text file comprises said particular content of said recorded speech in a textual form, said text file being divided into multiple text segments that are each provided with a unique identifier;
a second device for constructing a searchable index comprising a number of index elements from said text file, each of said index elements being associated with particular information located in one or more of said text segments;
a third device for searching said index elements of said searchable index with one or more specified search arguments, in order to detect one or more text segments of said text file that each contains at least some of said specified speech content; and
a fourth device for using the identifiers of respective detected text segments to locate said specified speech content in said audio file.

12. The apparatus of claim 11, wherein:
said apparatus includes means for dividing said audio file into multiple audio segments, each audio segment containing data corresponding to the data of a corresponding text segment, and each audio segment being identifiable by the identifier of its corresponding text segment.

13. The apparatus of claim 12, wherein:
said audio file is in a digitized and compressed form, and said apparatus includes means for retrieving specified content contained in a given one of said audio segments by decompressing said given audio segment of said compressed audio file, while other portions of said audio file remain compressed.

14. The apparatus of claim 11, wherein:
said second device is configured to construct said index by generating a concordance of words occurring in said text file, and using said concordance to apply weights to selected words and phrases.

15. The apparatus of claim 14, wherein:
said second device is configured to select elements in said searchable index from a group that includes words and phrases occurring in said text file with a specified minimum level of frequency, and topics of discussion identified by selected data mining software.

16. In association with stored data derived from recorded speech of one or more human speakers, a computer program product in a computer recordable storage medium for locating specified speech content included in the stored data, wherein said computer program product comprises:
first instructions for converting an audio file into a corresponding text file, wherein said audio file comprises particular content of said recorded speech in an audio form, and said text file comprises said particular content of said recorded speech in a textual form, said text file being divided into multiple text segments that are each provided with a unique identifier;
second instructions for constructing a searchable index comprising a number of index elements from said text file, each of said index elements being associated with particular information located in one or more of said text segments;
third instructions for searching said index elements of said searchable index with one or more specified search arguments, in order to detect one or more text segments of said text file that each contains at least some of said specified speech content; and
fourth instructions for using the identifiers of respective detected text segments to locate said specified speech content in said audio file.

17. The computer program product of claim 16, wherein:
said audio file comprises multiple audio segments, each audio segment containing data corresponding to the data of a corresponding text segment, each audio segment being identifiable by the identifier of its corresponding text segment.

18. The computer program product of claim 17, wherein:
said audio file is in a digitized and compressed form, and specified content contained in a given one of said audio segments is retrieved by decompressing said given audio segment of said compressed audio file, while other portions of said audio file remain compressed.

19. The computer program product of claim 16, wherein:
said index is constructed by generating a concordance of words occurring in said text file, and using said concordance to apply weights to selected words and phrases.

20. The computer program product of claim 19, wherein:
elements in said searchable index are selected from a group that includes words and phrases occurring in said text file with a specified minimum level of frequency, and topics of discussion identified by selected data mining software.

* * * * *